US006886410B1

(12) United States Patent
Wang et al.

(10) Patent No.: US 6,886,410 B1
(45) Date of Patent: May 3, 2005

(54) MODIFIED DUAL DIAPHRAGM PRESSURE SENSOR

(75) Inventors: Tzu-Yu Wang, Maple Grove, MN (US); Eugen I Cabuz, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 3 days.

(21) Appl. No.: 10/748,817

(22) Filed: Dec. 30, 2003

(51) Int. Cl.⁷ .............................................. G01L 9/12
(52) U.S. Cl. ...................................................... 73/718
(58) Field of Search .............................. 73/40, 40.5 R, 73/49.2, 49.3, 706, 715–727; 361/283.1, 361/283.2, 283.3, 283.4

(56) References Cited

U.S. PATENT DOCUMENTS

| | | | | |
|---|---|---|---|---|
| 4,336,567 A | * | 6/1982 | Anastasia | 361/283.3 |
| 4,598,576 A | * | 7/1986 | Goldsmith et al. | 73/31.07 |
| 4,926,874 A | * | 5/1990 | Lee | 600/495 |
| 5,699,041 A | * | 12/1997 | Ballyns | 340/442 |

* cited by examiner

Primary Examiner—William Oen
(74) Attorney, Agent, or Firm—Kris T. Fredrick

(57) ABSTRACT

A device for sensing pressure including a chamber defining part having a first diaphragm mounted in communication with the sealed chamber defining part, and a second diaphragm electrically insulated from the first, preferably by a spacer. The diaphragms are flexible and have a conductive surface. A sensor chamber is mounted on the other side of the second diaphragm. It has an opening in communication with a sensing atmosphere. One of the diaphragms includes openings it its surface to permit fluid to flow through the openings and the other diaphragm is solid and responds to change in pressure in the sensor chamber to move away from or toward the one diaphragm. Electrical connections measure the capacitance between the diaphragms as a function of the pressure in the sensor chamber.

20 Claims, 2 Drawing Sheets

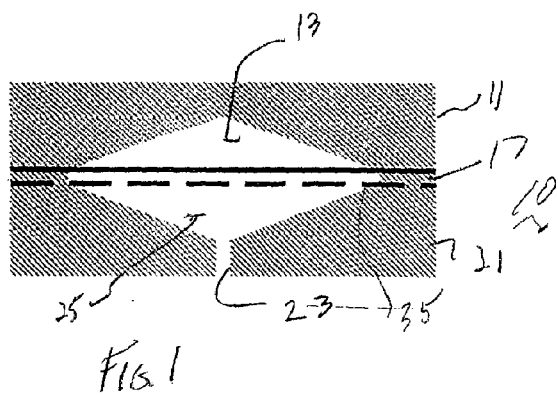
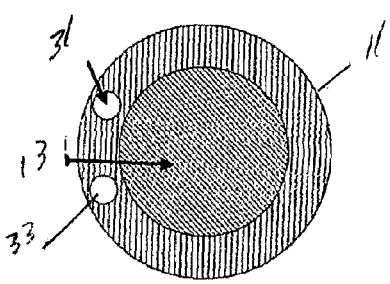
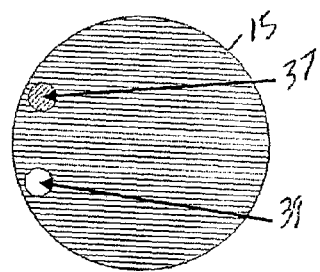
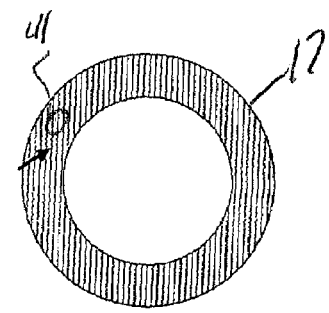
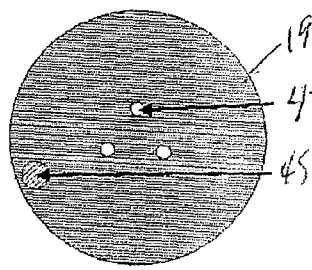
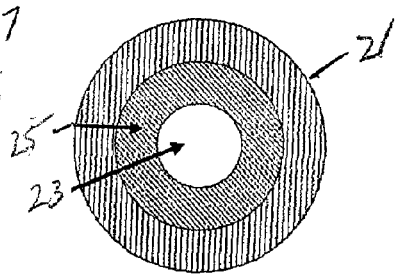

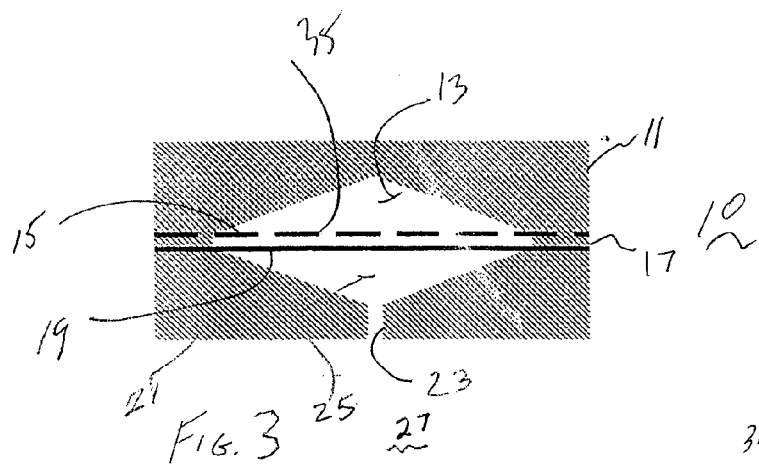
FIG. 3
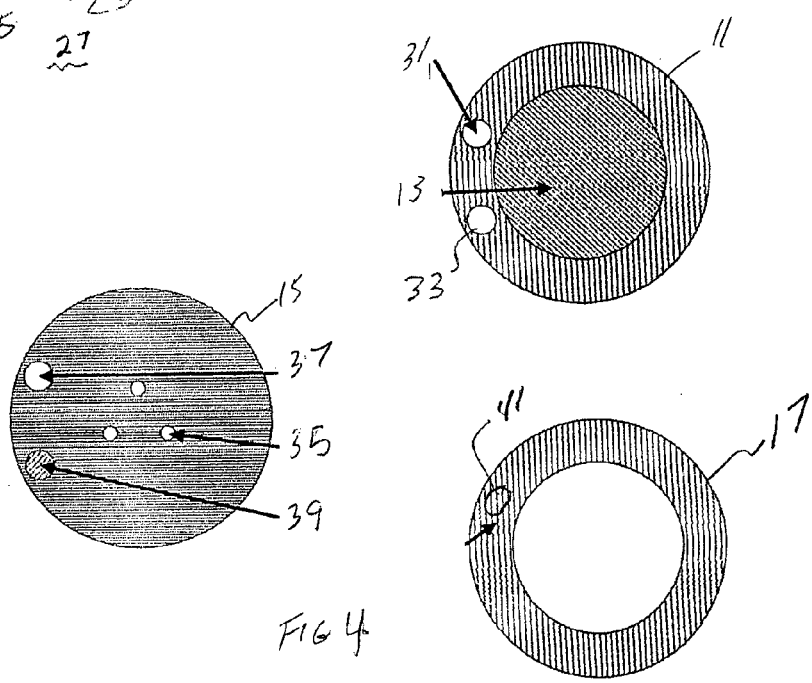
FIG 4
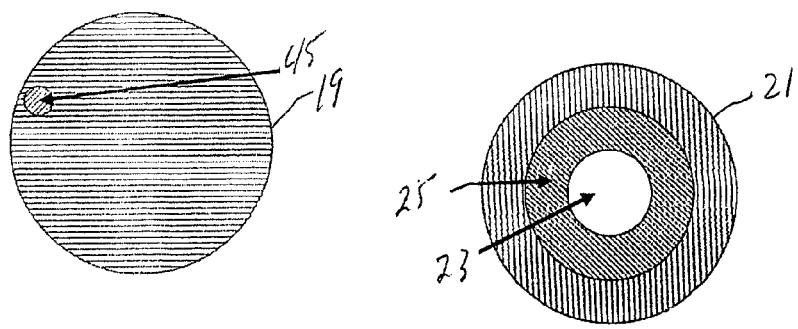

MODIFIED DUAL DIAPHRAGM PRESSURE SENSOR

FIELD OF THE INVENTION

The present invention relates in general to pressure sensor technology and, more particularly, to low cost pressure sensors for either disposable or high volume applications of pressure sensors for gas and liquid based pressure sensing.

BACKGROUND OF THE INVENTION

Modern industrial, commercial aerospace and military systems depend critically on reliable pumps for fluid handling. Both gas and liquid fluids take advantage of smaller, more distributed and more portable systems for increasing uses in instrumentation and control.

Although important advances in pump technology have been made in the past few decades, progress has been slowed down considerably in the ability to reduce pump size, weight, power consumption and cost. There remains a large gap between the technology for conventional pumps, including micropumps, and more advanced pumps based on microelectronics technology.

The pumping range of micropumps is from about one to tens of microliters per minute. Thus they are useful for applications such as implantable systems for drug delivery or micro dosage for chemical analysis systems. However, pump speeds are still too slow for use in sampling applications. Pressure sensing can at times require rapid reports of any change in pressure, particularly to anticipate a major change in pressure before it fully takes place.

It has been proposed to use mesoscopic pumps with no rotating or sliding parts, with high electrical-to-pneumatic conversion efficiencies. These meso pumps have significantly increased the capabilities of military systems that detect chemical biological, explosive or other agents. Some of these pumps are disclosed in U.S. Pat. No. 5,836,750, in which a plurality of chambers, such as, for example, three or four chambers, each of which having a single diaphragm. The devices are admirably suited for the intended purpose, but have some limitations in other aspects. Of prime concern is the presence of lateral channels, which result in dead space.

To overcome this situation, an improved electrostatic pump has been developed, as described in U.S. Pat. No. 6,179,586. In this patent, the pump consists of a single molded plastic chamber with two thin diaphragms staked directly on top of each other. The diaphragms are actuated, depending on design, with electrostatic, electromagnetic or piezoelectric methods. This patent describes the use of a single chamber for pumping.

While this prior patent also is a major improvement in the art, it does have some limitation. For example, the prior patent requires metalization and dielectric patterning of the molded plastic parts. The method of sensing does not permit the use of the same device to sense positive pressure and negative pressure without modifying the device. The prior art patent causes both diaphragms to move together as part of the pumping action. It does not disclose any other use of the structure.

It would be of great advantage if a pressure sensor could be developed that would utilize conventional mesopump construction and would have other uses.

Another advantage would be if mesopump technology could be modified to provide accurate pressure sensing devices for both liquid and gas, and for positive and negative pressures.

Other advantages and features will appear hereinafter.

SUMMARY OF THE INVENTION

The present invention provides a low cost, effective meso-pressure sensor that is capable of measuring both positive and negative pressure, depending upon how the device is configured. It is made from inexpensive, injection molded plastics and plastic films that are readily available from many commercial sources.

In its simplest form the invention comprises a stack of components or elements that form the pressure sensor. A sealed chamber part is of standard design and made from plastic or other materials. Openings are made or molded into the part to permit electrical contact with other elements of the device. A first diaphragm is placed with one side against the chamber part, and a spacer is placed against the other side of the first diaphragm. The first diaphragm has a first contact point aligned with one of the openings in the chamber part to make electrical contact. The spacer also may be provided with an opening to permit the electronic connection not contacting the first diaphragm. A second diaphragm is placed on the other side of the spacer and electrical contact is made with that part as well. Both the first and second diaphragms will have some metalization and, optionally, a dielectric film thereon. Finally, a sensor chamber part of the same design as the sealed chamber part mates with the second diaphragm. This sensor chamber part has an opening in communication with the environment being sensed.

In addition to this configuration, the device includes one additional feature. One of the two diaphragms has at least one hole in it to permit liquid or gas to pass through the at least one hole and not deflect the selected diaphragm. The other diaphragm has no holes and is oriented to the sensing atmosphere so as to cause this other diaphragm to deflect when pressure changes in the sensing atmosphere. The capacitance between the two diaphragms is measured or plotted, using the connections and electrical contact described above, and a change in pressure will result in a measurable change in capacitance. The device thus functions as a pressure sensor.

When the device is measuring a positive pressure, first diaphragm is solid and the second diaphragm has the openings therein. Thus when sensing atmosphere pressure changes, such as by an increase in pressure, the first diaphragm will move away from the second diaphragm and the change in capacitance will indicate a rise in pressure. If the pressure drops but is still positive, the first diaphragm will move toward the second diaphragm and that change in pressure will be measured by the change in capacitance between the two diaphragms.

When the device is measuring a negative pressure, first diaphragm has the openings and the second diaphragm is solid. Thus when negative pressure changes, such as by an decrease in pressure or increase in vacuum, the second diaphragm will move away from the first diaphragm and the change in capacitance will indicate a drop in pressure or increase in vacuum. If the pressure increases but is still negative, the second diaphragm will move toward the first diaphragm and that change will be measured by the change in capacitance between the two diaphragms.

BRIEF DESCRIPTION OF THE DRAWINGS

For a more complete understanding of the invention, reference is hereby made to the drawings, in which:

FIG. 1 is a side elevational view, in section, of one embodiment of the present invention;

FIG. 2 is an exploded plan view of the embodiment shown in FIG. 1;

FIG. 3 is a side elevational view, in section, of another embodiment of the present invention; and FIG. 4 is an exploded plan view of the embodiment shown in FIG. 3;

In the figures, like reference characters designate identical or corresponding components and units throughout the several views.

DETAILED DESCRIPTION OF THE PREFERRED EMBODIMENT

Referring to the figures, the device 10 generally includes an upper sealed chamber defining part 11 with chamber 13; A first flexible diaphragm 15 has two sides and is mounted on one side on part 11 in communication with the chamber 13 in said sealed chamber defining part 11, First flexible diaphragm 15 has a conductive surface which might be metal and may include a dielectric material also.

Spacer 17 is mounted on the other side of said first flexible diaphragm 15 and a second flexible diaphragm 19 and having two sides is mounted on one side in communication with spacer 17. Second flexible diaphragm 19 also has a conductive surface, preferably placed thereon by a simple, conventional metalization process, and may also have a dielectric material thereon.

A sensor chamber defining part 21 is mounted on the other side of said second flexible diaphragm 19. Part 21 has an opening 23 for connecting chamber 25 with a sensing atmosphere 27.

Parts 11 and 21, as well as spacer 17, may be made from any solid material. Preferred are plastics that can be easily molded or otherwise fabricated into the desired shape economically and quickly. Flexible diaphragms 15 and 19 are plastic films that are conductive and made so by metalization and/or dielectric film coatings as noted above.

Part 11 forms a sealed chamber with a baseline pressure that is determined during assembly. The device is capable of operating as a sensor to measure positive pressure or negative pressure or vacuum, depending on the configuration of the diaphragms. Depending on choice, one of first and second flexible diaphragms 15 and 19 includes openings it its surface to permit fluid to flow through the openings. The other of said first and second diaphragms 15 and 19 is solid and responds to change in pressure in said sensor chamber 25 to move away from or toward the one of said flexible diaphragms with holes.

Electrical connections are made to first and said second flexible diaphragms 15 and 19 through holes 31 and 33 in sealed chamber 11. First diaphragm 15 has a hole 37 for the electrical connection to pass through and a contact point 39 where electrical connection is made to diaphragm 15. Spacer 17 also has a hole or port 41 to pass an electrical connection to second flexible diaphragm 19 at contact point 45. These connections and contacts permit the device to measure the capacitance between said diaphragms 15 and 19 as a function of the pressure in said sensor chamber 15, introduced through opening 23. Change in pressure causes one flexible diaphragm to move with respect to the other flexible diaphragm.

In FIGS. 1 and 2, the device of this invention is configured to measure positive pressure. Holes 35 are located in second flexible diaphragm 19, while first flexible diaphragm 15 is solid. When positive pressure enters chamber 25, flexible diaphragm 15 is pushed or flexed away from the second diaphragm 19, which does not move because the pressure on both of its sides is equalized through holes 35. Solid flexible diaphragm 15 forms chamber 13 with part 11 and, as noted, is set at a baseline pressure during assembly to act as a controlled resistance against pressure in chamber 25.

In FIGS. 3 and 4, the device of this invention is configured to measure negative pressure. Holes 35 are located in first flexible diaphragm 15, while second flexible diaphragm 19 is solid. When negative pressure is seen in chamber 25, flexible diaphragm 19 is pulled or flexed away from the first diaphragm 15, which does not move because the pressure on both of its sides is equalized through holes 35. Solid flexible diaphragm 19 forms chamber 13 with part 11 and, as noted, is set at a baseline pressure during assembly to act as a controlled resistance against pressure in chamber 25.

In some instances where an extremely inexpensive device is desired, or if the device is to be small, spacer 17 may not be needed in certain applications. Flexible diaphragms 15 and 19 would be mounted between the sealed chamber part 11 and the sensing chamber part 21 without spacer 17. In other applications, the sensor chamber part 21 may be no more than the outer face of second flexible diaphragm 19 in communication with the sensing atmosphere.

The sensing atmosphere may be any fluid, including gases such as the atmosphere, gas pumps, chemical and electrolytic reactions, and the like or including liquids such as reactors, test devices, pumps and the like.

While particular embodiments of the present invention have been illustrated and described, they are merely exemplary and a person skilled in the art may make variations and modifications to the embodiments described herein without departing from the spirit and scope of the present invention. All such equivalent variations and modifications are intended to be included within the scope of this invention, and it is not intended to limit the invention, except as defined by the following claims.

What is claimed is:

1. A device for sensing pressure, comprising:
   a sealed chamber defining part;
   a first flexible diaphragm having two sides and mounted on one side in communication with the chamber in said sealed chamber defining part, said first flexible diaphragm having a conductive surface;
   an insulator mounted on the other side of said first flexible diaphragm;
   a second flexible diaphragm having two sides and mounted on one side in communication with said insulator, said second flexible diaphragm having a conductive surface;
   a sensor chamber defining part mounted on the other side of said second flexible diaphragm and having an opening for communication with a sensing atmosphere, whereby one of said first and second flexible diaphragms includes openings it its surface to permit fluid to flow through said openings and the other of said first and second diaphragms is solid and responds to change in pressure in said sensor chamber to move away from or toward said one of said flexible diaphragms; and
   electrical connections contacting said first and said second flexible diaphragms and adapted to measure the capacitance between said diaphragms as a function of the pressure in said sensor chamber introduced through said opening and causing said one flexible diaphragms to move with respect to the other of said flexible diaphragms.

2. The device of claim 1, wherein insulator is a solid, non conductive spacer.

3. The device of claim 1, wherein said fluid is selected from liquids and gases.

4. The device of claim 1, wherein said first said first and second flexible diaphragms includes conductive surfaces and electrical contact points.

5. The device of claim 4, wherein said first said first and second flexible diaphragms further includes dielectric film thereon.

6. The device of claim 1, wherein said second flexible diaphragm includes openings it its surface to permit fluid to flow through said openings and said first diaphragm is solid and responds to change in pressure in said sensor chamber means to move away from or toward said second flexible diaphragm means for detecting positive pressure.

7. The device of claim 1, wherein said first flexible diaphragm includes openings it its surface to permit fluid to flow through said openings and said second diaphragm is solid and responds to change in pressure in said sensor chamber to move away from or toward said second flexible diaphragm for detecting negative pressure.

8. A device for sensing pressure, comprising:
sealed chamber means for defining a sealed chamber;
first flexible diaphragm means for mounting in communication with said sealed chamber means, said first flexible diaphragm means having a conductive surface;
insulator means for insulating said first diaphragm and being mounted on the other side of said first flexible diaphragm means;
second flexible diaphragm means for mounting in communication with said insulator means, said second flexible diaphragm means having a conductive surface;
sensor chamber means for communicating with a sensing atmosphere and mounted on the other side of said second flexible diaphragm means; and
electrical connection means for measuring the capacitance between said first and said second flexible diaphragm means as a function of the pressure in said sensor chamber means introduced through said opening.

9. The device of claim 8, wherein said insulator means is a solid, non conductive spacer means for separating said first and second flexible diaphragm means.

10. The device of claim 8, wherein said fluid is selected from liquids and gases.

11. The device of claim 8, wherein said first said first and second flexible diaphragm means include conductive surfaces and electrical contact points.

12. The device of claim 11, wherein said first said first and second flexible diaphragm means further includes dielectric film thereon.

13. The device of claim 8, wherein said second flexible diaphragm means includes openings it its surface to permit fluid to flow through said openings and said first diaphragm means is solid and responds to change in pressure in said sensor chamber means to move away from or toward said second flexible diaphragm means for detecting positive pressure.

14. The device of claim 8, wherein said first flexible diaphragm means includes openings it its surface to permit fluid to flow through said openings and said second diaphragm means is solid and responds to change in pressure in said sensor chamber means to move away from or toward said first flexible diaphragm means for detecting negative pressure.

15. A method for sensing pressure in a sensing atmosphere, comprising the steps of:
exposing a sensor to said sensing atmosphere by a sensor device having two ends, said sensor device having an opening at one end for communication with said sensing atmosphere, said opening forming part of a sensor chamber defining part;
a sealed chamber defining part forming the other end of said device;
said device having a first flexible diaphragm having two sides and mounted on one side in communication with the chamber in said sealed chamber defining part, said first flexible diaphragm having a conductive surface;
said device having an insulator on the other side of said first flexible diaphragm;
said device having a second flexible diaphragm having two sides and mounted on one side in communication with said insulator, said second flexible diaphragm having a conductive surface;
said sensor chamber defining part being mounted on the other side of said second flexible diaphragm;
providing one of said first and second flexible diaphragms with openings it its surface to permit fluid to flow through said openings and the other of said first and second diaphragms being solid and responsive to change in pressure in said sensor chamber to move away from or toward said one of said flexible diaphragms;
making electrical connections contacting said first and said second flexible diaphragms and measuring the capacitance between said diaphragms as a function of the pressure in said sensor chamber introduced through said opening and causing said one flexible diaphragms to move with respect to the other of said flexible diaphragms; and
noting the pressure in said sensing atmosphere as a function of said capacitance.

16. The method of claim 15, wherein said fluid is selected from liquids and gases.

17. The method of claim 15, wherein said first said first and second flexible diaphragms includes conductive surfaces and electrical contact points.

18. The method of claim 17, wherein said first said first and second flexible diaphragms further includes dielectric film thereon.

19. The method of claim 15, wherein said second flexible diaphragm includes openings it its surface to permit fluid to flow through said openings and said first diaphragm is solid and responds to change in pressure in said sensor chamber means to move away from or toward said second flexible diaphragm means for detecting positive pressure.

20. The method of claim 15, wherein said first flexible diaphragm includes openings it its surface to permit fluid to flow through said openings and said second diaphragm is solid and responds to change in pressure in said sensor chamber to move away from or toward said second flexible diaphragm for detecting negative pressure.

* * * * *